(No Model.)
A. E. DU BOIS-REYMOND.
DISTRIBUTION OF ROTARY ELECTRIC CURRENTS.
No. 477,250. Patented June 21, 1892.
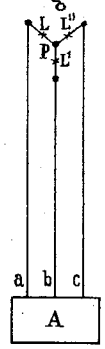
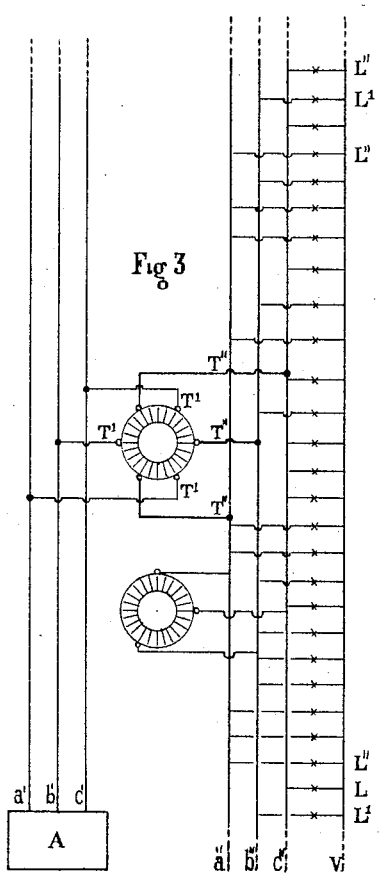
WITNESSES:
INVENTOR
Alard Emile du Bois Reymond
BY
Geo. H. Benjamin
ATTORNEY.

UNITED STATES PATENT OFFICE.

ALARD EMILE DU BOIS-REYMOND, OF BERLIN, GERMANY, ASSIGNOR TO SIEMENS & HALSKÉ, OF SAME PLACE.

DISTRIBUTION OF ROTARY ELECTRIC CURRENTS.

SPECIFICATION forming part of Letters Patent No. 477,250, dated June 21, 1892.

Application filed April 30, 1891. Serial No. 391,157. (No model.)

*To all whom it may concern:*

Be it known that I, ALARD EMILE DU BOIS-REYMOND, a subject of the Emperor of Germany, and residing at the city of Berlin, Kingdom of Prussia, German Empire, have invented a new and Improved System of Distributing Multiphase Alternate Currents of Electricity, of which the following is a specification.

It is now well known that an alternate current-generator of electricity may be so arranged as to transmit over separate conductors a corresponding number of alternate currents of electricity of equal period and amplitude, with their phases so timed or related to each other that the algebraic sum of the currents passing any section of all the conductors is always zero. Such alternate currents so generated and transmitted have been termed "multiphase" or "rotary" currents." For the industrial employment of multiphase or rotary currents at least three alternate currents must be generated, and hence three conductors used between the source of energy and the place where the currents are to be utilized. It will be understood, however, that it is perfectly possible to generate a greater number of separate currents, for the transmission of which a similar number of separate conductors must be employed.

My invention relates, broadly, to a system of distribution of such multiphase or rotary currents whereby all or any portion of the currents transmitted, where the number is or exceeds three, may be used to energize a rotary current motor or motors, and the currents conveyed by the separate conductors used individually through lamps or other translating devices, such as require for their operation but one alternating current.

It is important in carrying out a system of distribution of multiphase or rotary currents such as herein described to keep the potential of the currents transmitted by each conductor employed as nearly alike as possible, for the reason that upon this factor depends the loss in the conductors between the source of energy and the place of consumption. Further, as it is desirable that all the lamps or other translating devices fed by the separate conductors should be entirely independent of each other it is best to divide them as uniformly as possible between the separate conductors, as by following out this plan the demand made upon each conductor for current will be the same.

The accompanying figures illustrate diagrammatically the principle of my invention and how it may be embodied for practical use.

Figure 1 illustrates a system of distribution such as has been heretofore employed with multiphase or rotary currents. Figs. 2 and 3 illustrate the arrangement which constitutes the system which I propose to use.

In the drawings similar letters of reference indicate like parts.

For the purpose of clearness I will describe my invention as carried out in a system where the current transmitted is divided into three parts or phases (of equal period and amplitude) transmitted over three separate conductors.

Referring first to Fig. 1, A indicates a generator of alternating multiphase or rotary currents of any well-known type. $a\,b\,c$ are three conductors leading from the terminals of the generator to the place or district of consumption. L, L', and L'' represent lamps, respectively, connected through one terminal to the conductors $a\,b\,c$ and having their remaining terminals connected together at P. This arrangement is that which has heretofore been used in transmitting multiphase currents through lamps or similar devices, and is open to the very serious objection that every separate wave of current transmitted successively through the conductors $a\,b\,c$ distributes itself among the group of lamps in circuit, which are coupled in pairs in series. Consequently the average quantity of current in the separate conductors $a\,b\,c$ is considerably greater than that in the individual lamps. In order to obviate this objection, as stated, I have devised the arrangement shown in Fig. 2. In this case the lamp L has its terminals connected to the conductors $a\,b$, the lamp L' to the conductors $b\,c$, and the lamp L'' to the conductors $a\,c$. With this arrangement the separate currents flowing through the conductors $a\ b\ c$ will be equal to that flowing through the lamps L L' L'', which are in multiple of the conductors.

In the practical application of my system of distribution and in order to maintain the independence of the single lamps, as illustrated in Fig. 2, I arrange the several parts and circuits as shown in Fig. 3. The high-tension multiphase current from the source of energy A (multiphase generator) is carried as separate impulses of equal period, amplitude, and succeeding phase through the conductors $a'\ b'\ c'$. Located along these conductors and coupled in multiple thereto at any point or points where it is desired to utilize the current or a portion of the current transmitted by the conductors is a multiphase transformer or transformers T; but a single transformer is shown coupled in multiple through its primary terminals T' to the conductors $a'\ b'\ c'$. It will be understood, however, that any required number of such transformers may be so connected and fed from the primary high-tension conductors. The primary high-tension currents transmitted through the conductors $a'\ b'\ c'$ are converted in the transformer T into multiphase or rotary currents of low tension and then conveyed to the conductors $a''\ b''\ c''$ of the distributing-circuit, which conductors are connected in multiple with the secondary terminals T'' of the transformer. Adjacent to the distributing-conductors is a fourth conductor V.

The lamps or other translating devices L, L', and L'' which it is desired to feed by a single alternate current or phase of an alternate current are divided into three groups, corresponding with the number of separate alternate currents, and are respectively put in circuit, L'' between the conductors $a''$ and V, L' between $b''$ and V, and L between $c''$ and V. The conductor V in effect serves as an equalizing conductor, permits the independence of the lamps or other translating devices in circuit with it to be maintained, both as regards the group in which they are included and the other groups fed from separate conductors, and at the same time also serves to bring about the proper distribution of the current of a conductor through the separate devices included in a group fed by such conductor.

M represents a rotary current motor connected to the three distributing-conductors $a''\ b''\ c''$. Such a motor may be included in the primary circuit, if desired.

The operation of the motor will be readily understood by those skilled in the art to which this invention belongs without explanation.

It will be understood from the foregoing description that N alternate currents of equal period, amplitude, and successive phase may be transmitted over N conductors to the place or places of consumption, there transformed and distributed through N plus 1 conductors, and lamps or translating devices, such as require but one alternate current, included in circuit between any one of the N conductors and the 1 conductor, the best arrangement being as herein previously stated, to wit: to divide the whole number of devices to be operated with a single alternate current by the whole number of currents transmitted. The quotient will be the number of devices to be included in each group independently coupled in circuit between an N conductor and the 1 conductor.

Having thus described my invention, I claim—

1. In a system of distribution of multiphase electric currents, the combination, with a generator of multiphase currents, of main-line conductors leading therefrom, a multiphase transformer having its primary in circuit with said main-line conductors, distributing-conductors connected to the secondary of said transformer, an independent equalizing-conductor, and lamps or other translating devices in circuit between each secondary conductor and the independent conductor.

2. In a system of distribution of multiphase electric currents, the combination, with a generator of multiphase currents, of main-line conductors leading therefrom, a multiphase transformer having its primary in circuit with said main-line conductors, distributing-conductors connected to the secondary of said transformer, an electromotor or other translating device in circuit with said distributing-conductors, an independent equalizing-conductor, and lamps or other translating devices in circuit between each secondary conductor and the equalizing-conductor.

3. In a system of distribution of multiphase electric currents, the combination, with a generator of multiphase currents, of main-line conductors corresponding in number with the separate impulses transmitted from the generator, a multiphase transformer having its primary in circuit with said main-line conductors, distributing-conductors connected to the secondary of said transformer and corresponding in number with the secondary currents generated, an equalizing-conductor, and lamps or other translating devices in circuit between each secondary conductor and the equalizing-conductor.

4. In a system of distribution of multiphase electric currents, the combination, with a generator of multiphase currents, of main-line conductors corresponding in number with the separate impulses transmitted from the generator, a multiphase transformer having its primary in circuit with all or a portion of said main-line conductors, distributing-conductors connected to the secondary of said transformer and corresponding in number or in some multiple of the number of the main-line conductors connected with the primary of said transformer, an independent equalizing-conductor, and lamps or other translating devices in circuit between each secondary conductor and the equalizing-conductor.

5. In a system of distribution of multiphase electric currents, the combination, with the secondary distributing-conductors leading from a multiphase transformer, of an independent equalizing-conductor, and lamps or other translating devices in circuit between each secondary conductor and the equalizing-conductor.

6. In a system of distribution of multiphase electric currents, the combination, with the secondary distributing-conductors leading from a multiphase transformer, of an independent equalizing-conductor, and lamps or other translating devices between each secondary conductor and the equalizing-conductor, and such a number of lamps or other translating devices included in each circuit that their resistance shall be approximately equal.

7. The herein-described method of distributing alternating multiphase electric currents, which consists in generating a current made up of three or more successive phases or currents of equal period and amplitude, transmitting said current phases or currents separately to the place of consumption, there transforming them into secondary currents having the same phase and period but of a different tension, and subsequently distributing said secondary currents separately to electromotors or other translating devices, and in such a manner that the separate currents may be properly equalized between the different devices to which they are fed.

8. The herein-described method of distributing alternating multiphase electric currents, which consists in generating a current made up of three or more successive phases or currents of equal period and amplitude, transmitting said current-phases or currents separately to the place of consumption, there transforming them into secondary currents having the same phase and period, but of different tension, and subsequently distributing said secondary currents separately to electromotors and to other translating devices independent of said motors and in such a manner that the separate currents may be properly equalized between the independent translating devices to which they are fed.

In testimony whereof I have affixed my signature in presence of two witnesses.

ALARD EMILE DU BOIS-REYMOND.

Witnesses:
 JOHANNES GÖRGES,
 MAX WAGNER.